(12) United States Patent
Menow et al.

(10) Patent No.: US 8,431,059 B2
(45) Date of Patent: Apr. 30, 2013

(54) METHOD FOR MAKING A MOSAIC-STYLE ART PRODUCT

(75) Inventors: Steve Menow, Morrisville, PA (US); Anthony Wyzen, Northampton, PA (US)

(73) Assignee: Crayola LLC, Easton, PA (US)

( * ) Notice: Subject to any disclaimer, the term of this patent is extended or adjusted under 35 U.S.C. 154(b) by 398 days.

(21) Appl. No.: 12/688,215

(22) Filed: Jan. 15, 2010

(65) Prior Publication Data

US 2010/0201027 A1 Aug. 12, 2010

Related U.S. Application Data

(60) Provisional application No. 61/144,971, filed on Jan. 15, 2009.

(51) Int. Cl.
B29C 39/12 (2006.01)

(52) U.S. Cl.
USPC ......... 264/245; 249/55; 249/69; 249/70; 249/71; 249/77; 249/84; 249/85; 249/112; 249/113; 249/119; 249/127; 249/140; 434/96; 434/84

(58) Field of Classification Search ......... 264/245; 249/55, 69, 70, 71, 77, 84, 85, 112, 113, 249/119, 127, 140; 434/96, 84
See application file for complete search history.

(56) References Cited

U.S. PATENT DOCUMENTS

| 1,528,922 A * | 3/1925 | Glasgow | 249/55 |
| 2,400,482 A * | 5/1946 | Brannon et al. | 249/119 |
| 3,382,134 A * | 5/1968 | Powell | 428/38 |
| 3,414,642 A * | 12/1968 | Baum | 264/73 |
| 3,492,391 A * | 1/1970 | Van Atten | 264/245 |
| 3,619,456 A * | 11/1971 | Taylor, Jr. | 264/245 |
| 4,312,688 A * | 1/1982 | Brodis et al. | 156/63 |
| 5,171,766 A * | 12/1992 | Mariano et al. | 523/218 |

OTHER PUBLICATIONS http://web.archive.org/web/20051124141347/http:/www.quincrafts.com/makit_bakit.html Nov. 2005.*

* cited by examiner

*Primary Examiner* — Joseph S Del Sole
*Assistant Examiner* — David N Brown, II
(74) *Attorney, Agent, or Firm* — Shook, Hardy & Bacon L.L.P.

(57) ABSTRACT

A mosaic-style art kit is provided. The art kit includes a frame, modeling material, and a guide sheet. The frame includes a peripheral surface operably configured to overlie the guide sheet, and a mosaic-style internal structure having partitions forming cavities for receiving and retaining the modeling material. A front side of the frame is placed on the guide sheet such that the mosaic-style internal structure is aligned with a design on the guide sheet. The design thereby instructs a color of modeling material to be inserted into each cavity of the internal structure. The modeling material is inserted accordingly, and the frame and guide sheet are separated to produce a mosaic-style art product.

6 Claims, 4 Drawing Sheets

METHOD FOR MAKING A MOSAIC-STYLE ART PRODUCT

CROSS-REFERENCE TO RELATED APPLICATIONS

This Application claims priority to U.S. Provisional Patent Application Ser. No. 61/144,971, filed Jan. 15, 2009, the disclosure of which is hereby incorporated herein in its entirety by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the invention include a mosaic-style art kit and a method for using the mosaic-style art kit. The mosaic-style art kit uses modeling material to create a mosaic-style portrait or scene. Particularly, the mosaic-style art kit includes a frame, modeling material, and a guide sheet. The frame includes a peripheral surface operably configured to overlie the guide sheet, and a mosaic-style internal structure for receiving and retaining the modeling material.

Further, the present invention includes a method for making mosaic-style art from modeling material. The method includes providing a frame having a peripheral surface and a mosaic-style internal structure. A modeling material and a guide sheet are provided. The modeling material is inserted into the mosaic-style internal structure of the frame. The sheet provides indicia indicating a particular color pattern for individual slots of the mosaic-style internal structure and a release coating to prevent the modeling material from adhering to the sheet.

DESCRIPTION OF THE DRAWINGS

Illustrative embodiments of the invention are described in detail below with reference to the attached drawing figures, wherein.

DETAILED DESCRIPTION

Figure 1:
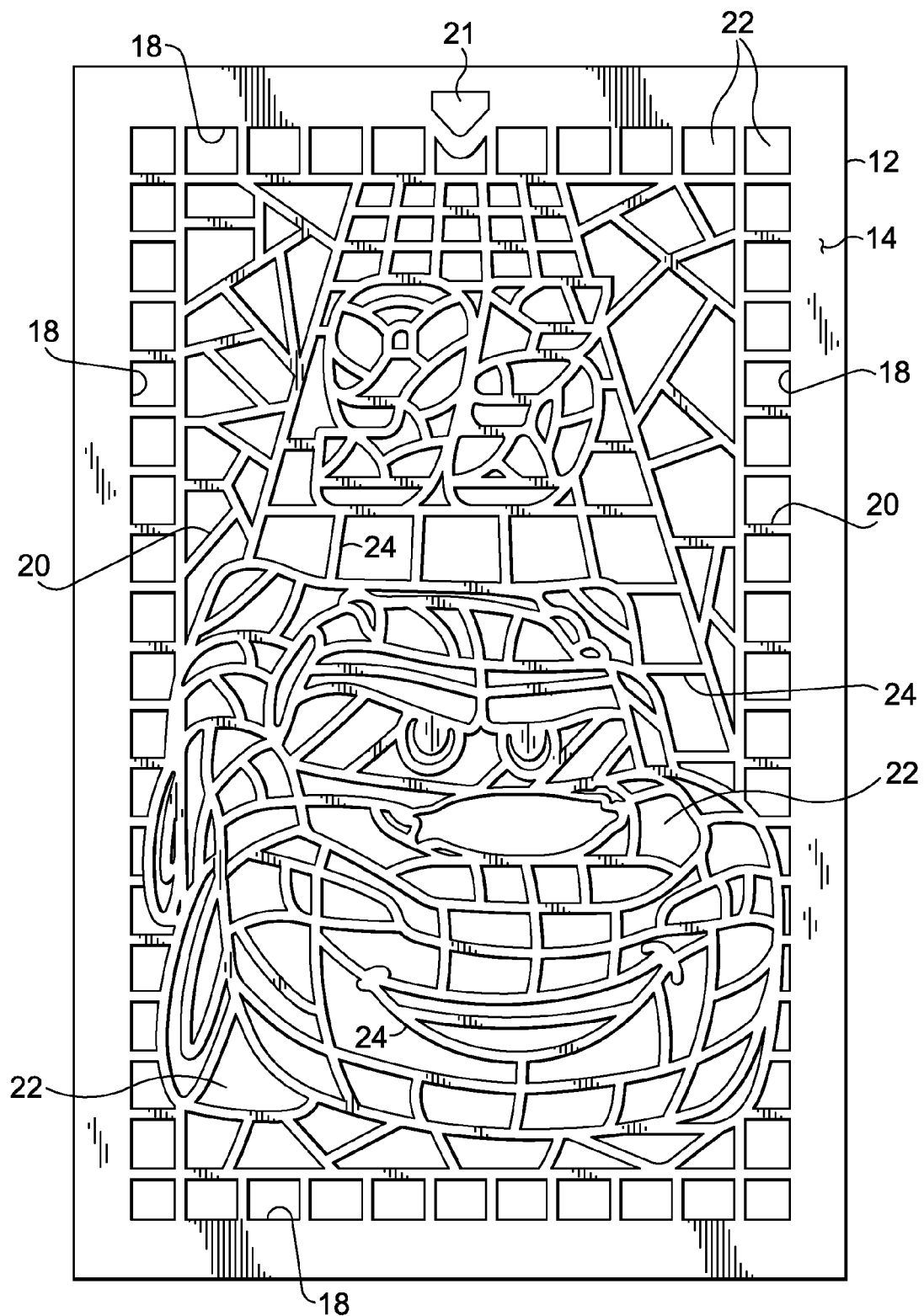
FIG. 1 is a graphical representation depicting a front side of a frame with a mosaic-style internal structure in accordance with an embodiment of the invention.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

The subject matter of embodiments of the invention is described with specificity herein to meet statutory requirements. But the description itself is not intended to necessarily limit the scope of the claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention describe an art apparatus for creating a mosaic-style art product. In an embodiment, a mosaic-style art kit is described. The kit includes a frame that includes a peripheral wall and a mosaic-style internal structure with cavities separated by partitions. The kit also includes a modeling material and a guide sheet having a design formed thereon that is configured to align with the mosaic style internal structure of the frame when the frame is overlaid on the guide sheet. The mosaic-style internal structure of the frame is configured to receive and retain the modeling material.

In another embodiment, a method for making a mosaic-style art product is described. A mosaic-style art kit including a frame having a peripheral surface and a mosaic-style internal structure with cavities formed by partitions, a modeling material, and a guide sheet having a design formed thereon that provides indicia indicating a particular color for individual cavities of the mosaic-style internal structure and a release coating to prevent the modeling material from adhering to the sheet is provided. The guide sheet is placed on a flat surface with the design facing away from the surface. The frame is placed on top of the guide sheet with a front side of the frame facing the guide sheet. The frame is aligned with the design on the guide sheet. The modeling material is inserted into the cavities of the internal structure of the frame. The design on the guide sheet indicates a color of modeling material to be inserted into each cavity. The frame and modeling material therein are separated from the guide sheet.

Referring now to FIGS. 1-4, a frame 12 of the art kit 10 is shown. The frame 12 includes a front side 14, a back side 16, a peripheral wall 18, and a mosaic-style internal structure 20. The front side 14 may include one or more features 21 that enhance the aesthetic appearance of the art kit 10 when viewed from the front side 14 such as for example, stickers, jewels, bevels, and printed or integrally formed designs, among others.

The peripheral wall 18 provides a continuous exterior frame around the internal structure 20. The peripheral wall 18 is rectangular in shape, but may be configured in any desired shape or form.

The mosaic-style internal structure 20 is composed of a plurality of individual cavities 22 formed by a plurality of partitions 24 for receiving and retaining a modeling material 26. The cavities 22 and partitions 24 are configured and arranged to provide any desired artistic appearance. For example, the cavities might be configured to resemble characters from a children's movie or storybook, among others. The internal structure 20 is integral to and extends from an interior portion of the peripheral wall 18.

The partitions 24 have a generally rectangular cross-section and are configured to form sides of the cavities 22. In an embodiment, the partitions 24 include features such as a flange extending from the front side 14 that may aid in retaining the modeling material 26 in the cavities 22 as depicted best in FIG. 4. The flange may also enhance the aesthetic appearance of the completed art kit 10 when viewed from the front side 14 by hiding from view areas of the cavities 22 along the partitions 24 that are not completely filled with modeling material 26. In another embodiment, the back side 16 of the partitions 24 also includes one or more features (not shown) such as flanges, ribs, cutouts, and the like that aid in retaining the modeling material 26 in the cavities.

The back side 16 of the frame 12 illustrates the desired mosaic-style scene in reverse. The back side 16 is used to receive and retain the modeling material 26 and create a mosaic-style image when viewing the frame 12 from the front side 14. The frame 12 may be constructed of many different types of materials, such as a plastic but it is not limited thereto. The frame 12 may comprise several distinct pieces that are interconnectable, or may be a unitary structure. In the situation where the frame 12 is comprised of two or more pieces, the individual pieces may be affixed to each other in a variety of known methods. For example, in an embodiment the frame consists of two subsections comprising an upper half of the frame and a lower half of the frame. The upper half and lower half are affixed through tabs on the upper half that are mateably received through a snap-fit in indents formed in the lower half of the frame (not shown). The frame 12 may also include one or more display components such as a picture hanger or stand (not shown) that aid in displaying the completed art kit by for example, hanging on a wall or standing up on a surface.

Figure 2:
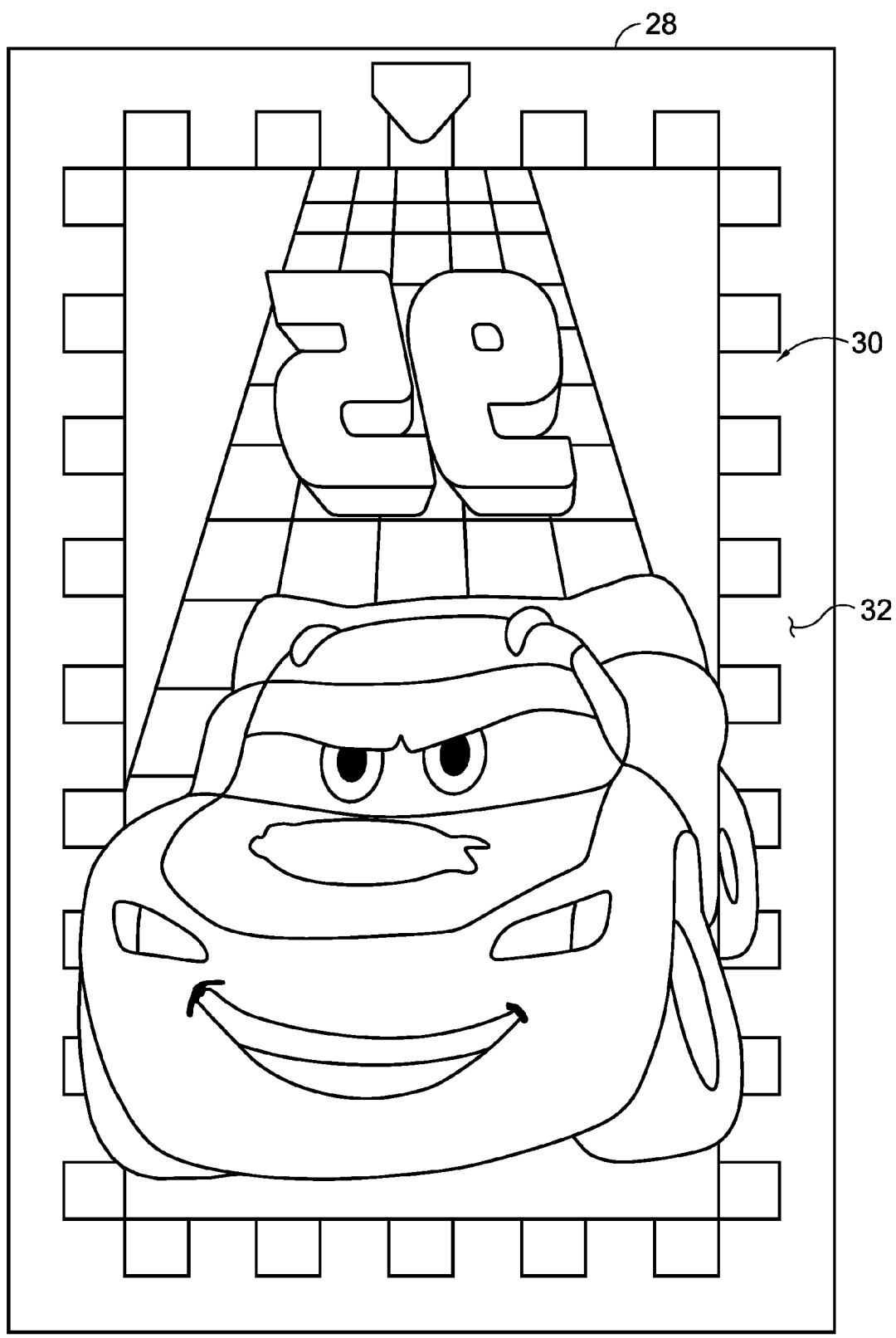
FIG. 2 is a graphical representation depicting a guide sheet with a design formed thereon and configured for use with the frame depicted in FIG. 1 in accordance with an embodiment of the invention.

A guide sheet 28, illustrated in FIG. 2, is a substantially flat, smooth surface having an image or design 30 formed thereon. The sheet 28 is made from any available materials including for example, and not limitation, paper, card stock, cardboard, fiber board, wood, plastic, metal, and the like. The design 30 comprises any desired design having any colors, patterns, or images. The design 30 may include lines or features mimicking the partitions 24 of the internal structure 20. The design 30 is formed on the sheet as a mirror image representation of the front side 14 of the frame 12 so as to allow the design to align with the front side 14 of the frame 12. The design 30 may be an exact mirror image of the frame or may merely resemble to overall image without the mosaic-style appearance provided by the partitions 24. In an embodiment, the sheet includes surface indentations or peaks (not shown) that result in textural elements of the finalized mosaic-style art product.

The sheet 28 is operably configured such that when the frame 12 overlies the sheet 28 with the front side 14 contacting the sheet 28, the design 30 is aligned with the internal cavities 22 of the frame 12. As such, the sheet 28 indicates a particular color of modeling material 26 that should be inserted into individual cavities 22 of the mosaic-style internal structure 20 to produce a design resembling the design 30 on the sheet 28. The color may be indicated by similarly colored regions in the design or by a code, symbol, or word printed on the design. The sheet 28 further comprises a release coating 32 that aids in preventing the modeling material 26 from adhering to the sheet 28. In an embodiment, the release coating 32 employs one or more of a wax, oil, silicon, or similar release agent to form a glossy, nonstick surface on the sheet 28.

The modeling material 26 comprises any available modeling material known in the art including, for example, and not limitation, clays, putties, and doughs. The modeling material 26 may comprise a significant amount of humectants such as glycerin and propylene glycol but is not limited to only these humectants. For example, the modeling material 26 might contain up to 30% by weight of humectants. Additionally, the modeling material 26 may include one or more polar polymeric resins, fillers, thickening agents, and water, among other component materials. In an embodiment, the modeling material 26 is Model Magic® Fusion™ Modeling Material manufactured by Crayola® and described in U.S. Pat. Nos. 5,171,766, 5,506,280, 5,364,892, 5,498,645, and 6,359,057, the disclosures of which are hereby incorporated herein by reference. The modeling material 26 may adhere to the frame 12 and the internal structure 20 but not to the guide sheet 28. Further, in an embodiment, the modeling material 26 is in many different colors which are placed into the individual cavities 22 corresponding to the color indicated by the design 30 of the guide sheet 28. The modeling material 26 may be configured to harden when exposed to air for a suitable amount of time, e.g., 12 hours.

Figure 3:
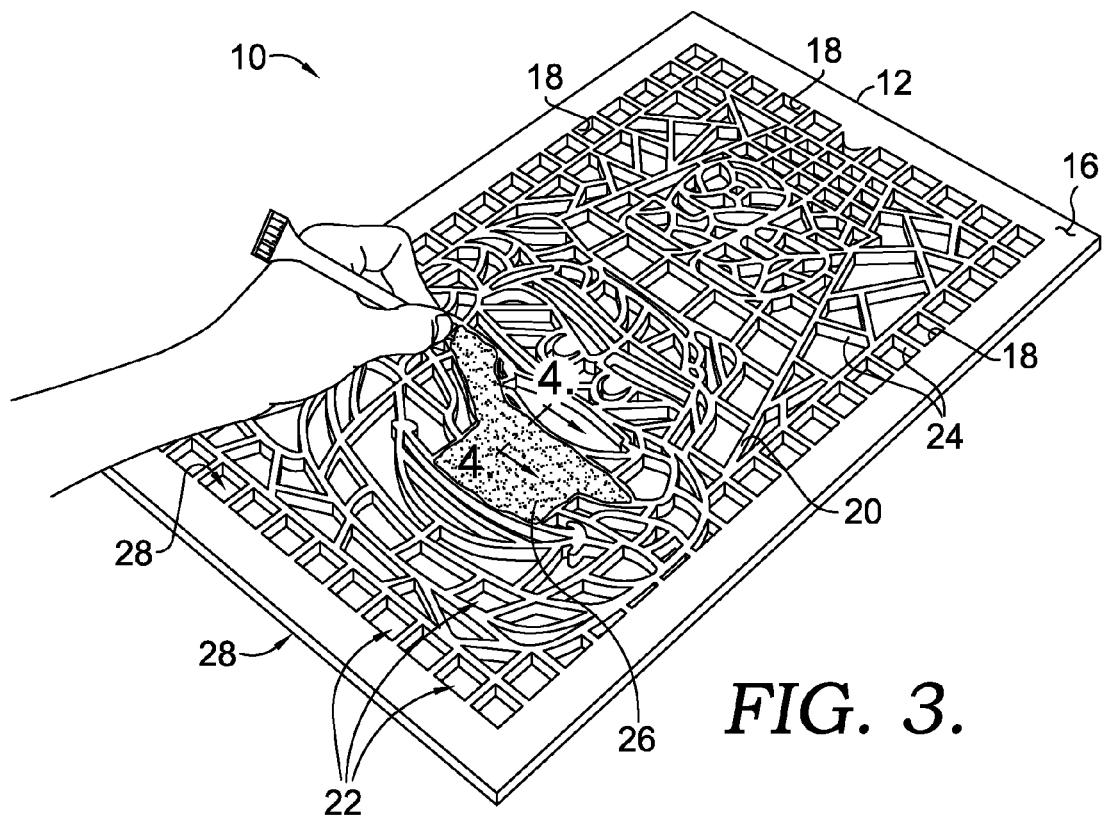
FIG. 3 is a perspective view depicting a user assembling a mosaic-style art product in accordance with an embodiment of the invention.
Figure 4:
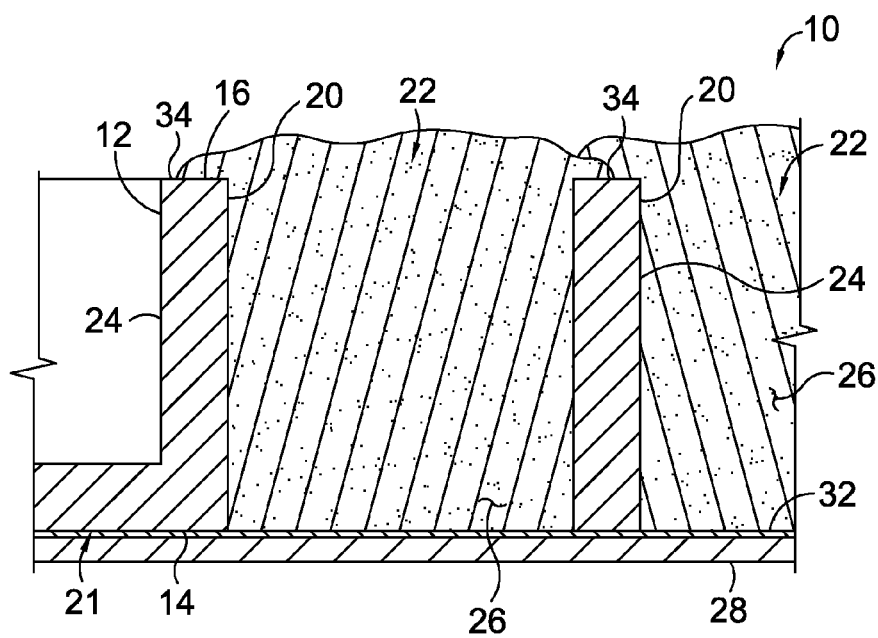
FIG. 4 is a cross-sectional view depicting cavities and partitions of a frame with a mosaic-style internal structure in accordance with an embodiment of the invention.
Figure 5:
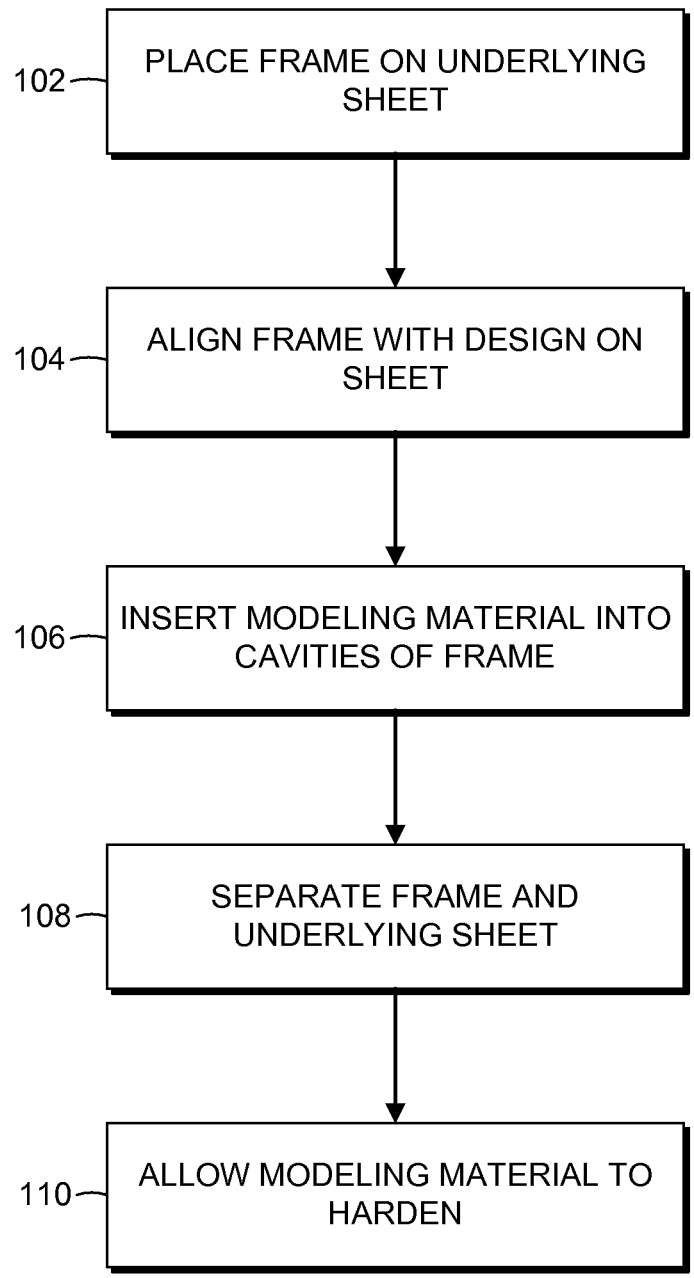
FIG. 5 is a flow diagram depicting a method for making a mosaic-style art product in accordance with an embodiment of the invention.

With additional reference now to FIG. 5, a method 100 for making a mosaic-style art product with the art kit 10 in accordance with an embodiment of the invention is described. As shown in FIG. 3, the front side 14 of the frame 12 is placed on the guide sheet 28, as indicated at 102. The frame 12 is positioned such that the design 30 of the guide sheet 28 aligns with the individual cavities 22 of the frame 12, as indicated at 104.

At 106, the modeling material 26 is inserted into the cavities 22. To fill the individual cavities 22 of the frame 12, a user takes an amount of the modeling material 26 corresponding to the size, shape, and color of a particular individual cavity 22, and presses the modeling material 26 into the particular individual cavity 22 until the space and edges of the individual cavity 22 are completely filled. Any number of tools can be used to fill the space and edges of the individual cavities 22 such as an individual's fingers, or a small modeling tool. For example, a small plastic tool having a blunt first end and a wedged or wide and flat second end may be used to press the modeling material into corners and tight areas of cavities. In an embodiment, a small amount of the modeling material 26 is pressed over a top edge 34 of the partitions 24 of the mosaic-style internal structure 20 to connect each cavity 22 to at least one adjacent cavity 22. It is generally not necessary to cover the entire frame 12 with modeling material 26.

Once the individual cavities 22 are filled with modeling material 26, the frame 12 and the guide sheet 28 are separated, as indicated at 108. The art kit 10 can then be viewed from the front side 14 to view a mosaic-style scene or image resembling that of the design 30. If desired, the modeling material 26 may be allowed to harden within the individual cavities 22 through exposure to air for a sufficient time period, e.g., several hours, to create a more permanent art product, as indicated at 110. Alternatively, the modeling material 26 may be removed from the cavities 22 and stored in an airtight container for future use.

In another embodiment (not shown), a plurality of interlocking frames is provided. Each of the interlocking frames is similar in configuration to the frame 12 described above with the addition of one or more connecting elements disposed along or near the perimeter of the interlocking frame. The connecting elements may take any desired form such as, for example, a snap-fit, a slot and tab, interlocking tabs, or hinges, among others. The interlocking frames are also provided with modeling material 26 in the same manner described above. Upon completion of filling the cavities of the interlocking frames with the modeling material 26 and removal of the guide sheets, the interlocking frames are connected along one or more sides via the connecting elements and positioned in a generally upright position to form a three-dimensional art kit. For example, six interlocking frames might be provided, four of which form the sides of a model house while the remaining two interlocking frames form a roof of the model house. As such, a three-dimensional model house may be constructed having a mosaic-styled appearance.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for making a mosaic-style art product, the method comprising:

providing a mosaic-style art kit including a frame having a peripheral surface and a mosaic-style internal structure comprising a plurality of cavities formed by a plurality of partitions, a modeling material, and a guide sheet having a design formed thereon that provides indicia indicating a particular color for individual cavities of the mosaic-style internal structure and a release coating to prevent the modeling material from adhering to the sheet, wherein the frame comprises a front side and a back side;

placing the guide sheet on a flat surface with the design facing away from the surface;

placing the frame on top of the guide sheet with the front side of the frame facing the guide sheet, wherein the front side of the frame is in direct contact with the guide sheet when the frame is placed thereon;

aligning the frame with the design on the guide sheet;

inserting the modeling material into the cavities of the internal structure of the frame, wherein the design on the guide sheet indicates a color of modeling material to be inserted into each cavity, and further wherein the modeling material is received from the back side of the frame;

applying an amount of modeling material over a back side of at least a portion of a partition to connect the modeling material in a first cavity with the modeling material in a second adjacent cavity; and separating the frame and modeling material therein from the guide sheet while the materials in the first and second cavities remain connected to each other and to the at least a portion of the partition.

2. The method of claim 1, further comprising:
allowing the modeling material to harden in the cavities.

3. The method of claim 1, further comprising:
removing the modeling material from the cavities; and
storing the modeling material for later use.

4. The method of claim 1, wherein inserting the modeling material into the cavities further comprises:
using a modeling tool to aid in filling the cavities.

5. The method of claim 1, further comprising:
attaching a first frame to one or more second frames to form a three-dimensional structure.

6. The method of claim 1, wherein the frame comprises two or more separate subsections and further comprising:
joining the two or more separate subsections of the frame together before placing the frame on top of the guide sheet.

* * * * *